Dec. 9, 1941.  J. L. WALL  2,265,707
PNEUMATIC CONVEYER SEPARATOR DEVICE
Filed Sept. 9, 1940
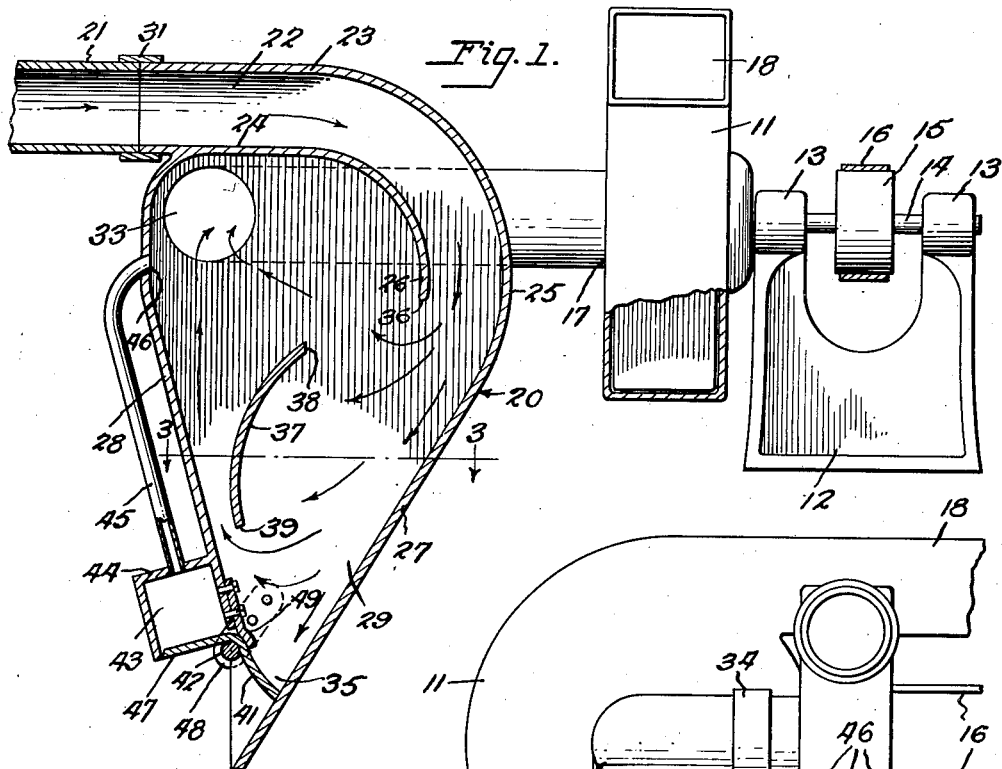
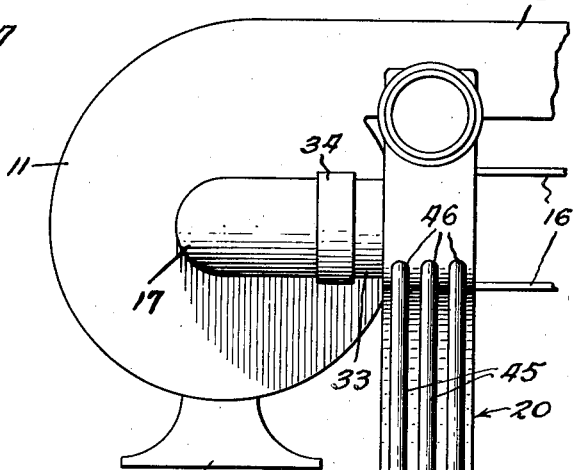
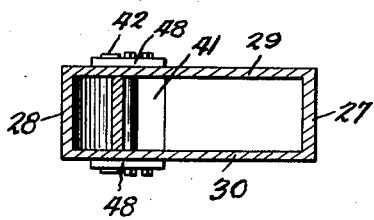
Inventor
J. L. Wall
By Mason Fenwick & Lawrence
Attorneys Patented Dec. 9, 1941

2,265,707

UNITED STATES PATENT OFFICE 2,265,707

PNEUMATIC CONVEYER SEPARATOR DEVICE

James L. Wall, Washington, Ga.

Application September 9, 1940, Serial No. 356,095

4 Claims. (Cl. 183—111)

This invention pertains to pneumatic conveyers for conveying solids in comminuted form suspended in a fluid in motion, and is directed to a device for separating the solids from the fluid transmitting medium.

Under prior art practice it is old to transmit solids in comminuted form, such as sand, wheat, grain, shavings, sawdust, etc., using a gaseous fluid in motion as a transmitting medium, the transmitting medium usually constituting air. The usual practice is to transmit the material through an air duct, the power source usually being a fan. Sometimes the fan is of the pusher type, but more frequently it is a draft fan, also known as an exhaust fan. It will be readily appreciated that the gaseous fluid passing through the fan will injure the moving parts, and the fan structure in general, if it contains finely comminuted solids. The device of the present invention is calculated to remove the solids from the gaseous fluid transmitting medium before it enters the fan, at a point which will prevent the solids from being carried into and through the fan with the fluid.

The device of the present invention is positioned in the fluid duct, thus requiring the solids bearing fluid to pass through the device. As the fluid passes through the device it separates the gaseous fluid from the solids and transmits it to the fan free of the solids, the solids being directed to a discharge passage from which they may be discharged to any suitable depository.

In its essential elements the invention comprises a distributing chamber with passages to direct the flow of air, or similar gaseous transmitting medium, in one direction through an exhaust duct, and the solids in another direction to a solids discharge passage. The fluid as it leaves the device can be transmitted into the fan at the intake duct thereof.

The present invention is directed to the relative distribution of the fluid intake duct, the fluid exhaust duct, and the solids discharge passage and comprises the novel structure of the distributing chamber. The invention includes a baffle within the chamber which directs the flow of fluid away from the direction of movement of the solids to the solids discharge passage, the baffle being so constructed as to prevent the solids from being lifted from the discharge passage to be carried into the fluid exhaust passage.

One feature of the invention resides in a closure element for the solids discharge passage which closure element is pneumatically operated by novel mechanism.

The nature and advantages of the invention will be clear from the accompanying drawing of a device comprising one practical and preferred embodiment of the invention. In the drawing:

Figure 1 shows the installation of the device, its structure being illustrated in cross sectional elevation;

Figure 2 shows the subject matter illustrated in Figure 1, viewed from the left of the figure; and Figure 3 is a cross sectional plan view, taken on line 3—3 of Figure 1, and viewed in the direction of the arrows.

The device of the invention is positioned in fluid passage ducts which pass through a fan 11, or similar air moving mechanism, the fan being supported by the base member 12. The base member 12 includes the bearings 13 in which the fan shaft 14 rotates, driven by any suitable means, as for example, by means of the pulley 15 keyed to the shaft 4, and the power belt 16.

The fan of the embodiment shown is commonly termed a draft fan, or an exhaust fan, and comprises the intake duct 17 and the exhaust duct 8. The fan may be of conventional construction, and requires no further description herein.

The device of the present invention is preferably installed in the fluid passage duct at a point in line with the intake duct 17 of the fan as shown, and it consists of the distributing chamber illustrated generally at 20. 21 represents the solids containing fluid duct which communicates with the intake duct 22 of the separating device. The intake duct comprises a top and bottom wall 23 and 24, respectively, which walls are disposed at the top of the distributing chamber 20 and are directed from the rear towards the front thereof, from the left to the right in Figure 1. The intake duct also comprises the forward and rearward walls 25 and 26, respectively. The distributing chamber comprises the forward and rearward walls 27 and 28, respectively, which together with the side walls 29 and 30 enclose the chamber. The side walls 29 and 30 also cooperate with the hereinbefore described walls of the intake duct to enclose it.

The rearward curved wall of the intake duct merges smoothly with the bottom wall thereof. The forward curved wall 25 of the intake duct merges smoothly with the top wall 23 and also with the forward wall 27 of the chamber. The intake duct is connected in line with the fluid transmitting duct 21 by any suitable joint such as 31. It will thus be seen that the solids containing fluid passing from the duct 21 into the duct 22 and into the chamber 20 will describe a smooth curve forwardly and then downwardly into the chamber.

The fluid exhaust duct 33 communicates with the intake duct 17 of the fan, as shown, and is joined thereto by any suitable means such as the joint 34. The fluid exhaust duct 33 is located at a point in the chamber rearwardly of the rearward curved wall 26 of the intake duct at a point near the top of the chamber. It may be located close to the rearward wall 28 of the chamber, as illustrated.

It will be noted that the rearward and forward walls 28 and 27, respectively, are directed downwardly converging towards each other to provide the solids exhaust passage 35 at the lower ends of the walls. It will thus be seen that the fluid being transmitted through the device will move forwardly and downwardly following the curved passage described by the forward and rearward walls 25 and 26, respectively, of the intake duct, and at the lower terminus 36 of the rearward wall 26 of the intake duct the fluid will be directed upwardly and rearwardly toward the fluid exhaust duct 33 as indicated by the arrows in Figure 1. The solids, however, being heavier than the fluid transmitting medium, will tend towards the curved forward wall 25 as they pass through the curved passage of the intake duct, due to centrifugal force set up by movement in a curved passage. Thus, as the solids are directed downwardly by the forward curved wall 25, and as they continue to fall, they will follow the forward wall 27 of the chamber towards the solids discharge passage 35.

The flow of fluid from the intake duct through the chamber 20 to the exhaust duct 33 will tend to carry with it the comminuted solid material. However, this tendency will have diminished to a great extent because of the loss of dynamic pressure as the fluid enters the greater volume of the distributing chamber. The baffle 37, extending between the side walls 29 and 30, as illustrated, also operates to prevent solid material from passing into the exhaust duct 33 with the transmitting fluid. The baffle 37, according to preferred construction, describes a curve directed rearwardly and downwardly toward the rearward wall 28 of the chamber which directs any material which impinges against it downwardly towards the solids discharge passage 35. The upper terminus 38 of the baffle 37 is spaced away from the lower terminus 36 of the rearward wall 26 of the intake duct to provide a passage therebetween for the flow of air from the intake duct to the exhaust passage. The baffle plate 37 is spaced away from the rearward wall 28 of the chamber progressively less in the downward direction, being spaced away from it at its lower terminus 39 to a minimum degree. Thus, any solids which pass above the upper terminus 38 of the baffle will be able to fall to the discharge passage 35 between the lower terminus 39 and the rearward wall of the chamber 28. The direction of air flow to the rear of the baffle 37 will be in an upward direction but the dynamic pressure of such air flow between the baffle 37 and the rearward wall 28 will be so low, because of the Venturi action in the passage, that it will not be strong enough to lift solid material into the exhaust duct 33, and will not prevent solids from falling through the passage.

The solids discharge passage 35 is provided with a closure element 41, pivoted at 42 to swing outwardly. Mechanism is provided to positively open the closure element 41 to discharge the solids, this mechanism comprising pneumatic means.

In the embodiment shown the pneumatic means comprises a vacuum, or low pressure chamber 43 attached to the rearward partition 28 of the distributing chamber 20 and outside thereof as shown. Communicating through the upper wall 44 of the chamber 43 is one or more exhaust ducts 45. The opposite ends of the ducts communicate with the distributing chamber 20 at 46, at a point near the fluid exhaust duct 33. Opposite the upper wall 44 of the low pressure chamber 43 there is the closure valve 47 which also pivots at 42 and which is attached to the closure element 41 of the solids discharge passage to move therewith. The closure valve 47 counterweights the closure element 41 of the solids discharge passage tending to hold it in closed position shown in Figure 1.

The pivot 42 may comprise a pin, as shown, to which the closure element 41 and closure valve 47 are attached, the pivot being mounted to rotate in the bearing brackets 48. The shield 49 attached to the rearward wall 28 and overlapping the pivot 42 operates to prevent an accumulation of solids from fouling the moving parts and impair the operation of the valve.

Operation of the device is as follows:

Transmitting fluid carrying comminuted solid material passes into the distributing chamber 20 under draft of the fan 11, the fluid entering the chamber through the intake duct 22. The draft within the chamber 20 is towards the exhaust duct 33 which communicates with the intake duct 17 of the fan 11. The path of the fluid into the chamber 20 is directed curvilinear, by the forward and rearward walls 25 and 26, respectively, of the intake duct, which sets up centrifugal force, and causes the heavier solid material to be thrown towards the forward partition 25 of the intake duct 22 to be guided thereby and by the forward partition 27 of the chamber towards the solids discharge passage 35.

The draft between the lower terminus 36 of the wall 26 of the intake duct and the upper terminus 38 of the baffle 37 towards the exhaust duct 33 will tend to carry the falling solids with it. The solids, because of their weight, fall sufficiently to impinge against forward surface of the baffle 37 and are directed downwardly thereby to the discharge passage 35. There is an upward draft in the passage between the rearward wall 28 and the baffle 37, but because of the diminishing pressure incident to the constantly widening passage it will not draw solids material up with it from the accumulation at the discharge passage 35, and will not withhold any solids which may pass rearwardly above the upper terminus 38 of the baffle from falling behind the baffle to the discharge passage.

The solids fall to the discharge passage 35 and against the closure element 41, the weight of the solids tending to open the closure element 41. The closure element 41 is maintained in closed condition by the counterweight of the closure valve 47 when the device is inoperative. When the device is in operation the valve 47 is subjected to counterforces on its upper and lower surfaces, the atmospheric pressure on its lower surface being greater than the vacuum within the chamber 43 and tending to open the valve 47 and closure element 41. Closure element 41 also is subjected to counterforces on its outer and inner surfaces, the atmospheric pressure on its outer surface being greater than vacuum within chamber 20, and tending to hold closure element 41 in the closed position, thus the valve 47 balances the closure element 41 against atmospheric pressure.

When the comminuted solids fall to passage 35 they accumulate there until their weight is sufficient to actuate the closure element 41 to open position and permit the solids to escape. This opens the closure valve 47 to place the low pressure chamber 43 under atmospheric pressure. The composite area of the several vacuum ducts 45 is not great enough to maintain a vacuum in the chamber 43 when the closure valve 47 is in open condition. This operation of the closure element 41 and the valve 47 allows the atmospheric pressure to hold closure element 41 firmly to the outflowing stream of solids and closes the closure element 41 and the valve 47 when the flow of solids has ended. Accordingly, the discharge of solid material does not interfere with the draft within the distributing chamber 20.

The movement of the closure valve 47 to closed condition, incident to the element 41 closing, creates a vacuum in the chamber 43 which sets the forces in the hereinbefore described balance of the beginning of the cycle, and the parts are now positioned for a new cycle of operation to begin.

The hereinbefore description is directed to a structure comprising one preferred practice of the invention. The structure shown is obviously susceptible of a number of modifications within the spirit and scope of the invention which, accordingly, is not measured by the disclosed embodiment. The scope of protection is determined by the accompanying claims.

What I claim is:

1. In a pneumatic material separating device having, a separating chamber, an intake duct, a fluid exhaust duct and a solids discharge passage, a closure element for the solids discharge passage, and pneumatic means to counterbalance operation of the closure, controlled by the pressure in the separating chamber.

2. In a pneumatic material separating device having, a separating chamber, an intake duct, a fluid exhaust duct, and a solids discharge passage, a closure element for the solids discharge passage, means to counterbalance operation of the closure element pneumatically comprising a low pressure chamber, one or more ducts communicating between the low pressure chamber and the separating chamber at a position near the fluid exhaust duct, a closure valve for the low pressure chamber, and an interconnection between the low pressure chamber valve and the solids discharge closure element.

3. In a pneumatic material separating device having, a separating chamber, an intake duct, a fluid exhaust duct, and a solids discharge passage, a closure element for the solids discharge passage, means to counterbalance operation of the closure element pneumatically comprising a low pressure chamber attached to the separating chamber, one or more ducts communicating between the low pressure chamber and the separating chamber at a position near the fluid exhaust duct, a closure valve for the low pressure chamber, and an interconnection between the low pressure chamber valve and the solids discharge closure element.

4. In a pneumatic material separating device having, a separating chamber, an intake duct, a fluid exhaust duct, and a solids discharge passage, a pivoted closure element for the solids discharge passage, means to counterbalance operation of the closure element pneumatically comprising a low pressure chamber adjacent the separating chamber solids outlet, one or more ducts communicating the low pressure chamber with the separating chamber, the discharge closure being formed with an extension to provide a closure for the low pressure chamber.

JAMES L. WALL.